(12) United States Patent
Rochelle et al.

(10) Patent No.: US 9,956,505 B2
(45) Date of Patent: May 1, 2018

(54) APPARATUS FOR AND METHOD OF REMOVING ACIDIC GAS FROM A GASEOUS STREAM AND REGENERATING AN ABSORBENT SOLUTION

(71) Applicant: BOARD OF REGENTS, THE UNIVERSITY OF TEXAS SYSTEM, Austin, TX (US)

(72) Inventors: Gary Rochelle, Austin, TX (US); Tarun Madan, Austin, TX (US); Yu-Jeng Lin, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 264 days.

(21) Appl. No.: 14/712,730

(22) Filed: May 14, 2015

(65) Prior Publication Data
US 2015/0246298 A1 Sep. 3, 2015

Related U.S. Application Data

(63) Continuation of application No. PCT/US2013/055446, filed on Aug. 16, 2013.
(Continued)

(51) Int. Cl.
*B01D 19/00* (2006.01)
*B01D 53/14* (2006.01)

(52) U.S. Cl.
CPC ..... *B01D 19/0036* (2013.01); *B01D 19/0068* (2013.01); *B01D 53/1425* (2013.01);
(Continued)

(58) Field of Classification Search
CPC ........ B01D 2256/245; B01D 2257/306; B01D 2257/308; B01D 2258/01; B01D 2258/0233; B01D 2258/0283; B01D 53/1425; B01D 53/1462; B01D 53/1475; C03C 2204/00; C03C 3/122; C03C 3/253; C03C 4/12; C09K 11/7707; C09K 11/883; C09K 11/886; H01S 3/1606; H01S 3/17; H01S 3/173; H01S 3/177; Y02C 10/06
See application file for complete search history.

(56) References Cited

U.S. PATENT DOCUMENTS 8,080,089 B1 12/2011 Wen et al.
2010/0229723 A1* 9/2010 Gelowitz ........... B01D 53/1425
95/162
(Continued)

FOREIGN PATENT DOCUMENTS

WO 2009112518 9/2009
WO 2012021728 2/2012

*Primary Examiner* — Cabrena Holecek
(74) *Attorney, Agent, or Firm* — Reed Smith LLP; Robert R. Riddle; Matthew S. Gibson

(57) ABSTRACT

An apparatus for and method of removing acidic gas from a gaseous stream and regenerating an aqueous solution allows for the recovery of waste heat of stripping steam and more economical regeneration of the aqueous solution. In at least one embodiment, one or more rich solvent bypasses combine with a rich solvent heat exchanger to recover waste heat. In another embodiment, the apparatus and method include one or more rich solvent bypasses and a heater positioned upstream of the stripper to more economically regenerate an aqueous solution.

7 Claims, 11 Drawing Sheets

Related U.S. Application Data

(60) Provisional application No. 61/726,355, filed on Nov. 14, 2012, provisional application No. 61/750,261, filed on Jan. 8, 2013.

(52) U.S. Cl.
CPC ..... *B01D 53/1462* (2013.01); *B01D 53/1475* (2013.01); *B01D 2252/204* (2013.01); *B01D 2252/20447* (2013.01); *B01D 2252/20478* (2013.01); *B01D 2252/30* (2013.01); *B01D 2256/10* (2013.01); *B01D 2256/16* (2013.01); *B01D 2256/245* (2013.01); *B01D 2257/306* (2013.01); *B01D 2257/308* (2013.01); *B01D 2258/01* (2013.01); *B01D 2258/0233* (2013.01); *B01D 2258/0283* (2013.01); *Y02C 10/06* (2013.01)

(56) References Cited

U.S. PATENT DOCUMENTS

| | | | |
|---|---|---|---|
| 2010/0242731 A1* | 9/2010 | Baburao | B01D 53/1425 95/179 |
| 2011/0120315 A1* | 5/2011 | Iijima | B01D 53/1406 96/242 |
| 2012/0118162 A1 | 5/2012 | Ogawa et al. | |

* cited by examiner

APPARATUS FOR AND METHOD OF REMOVING ACIDIC GAS FROM A GASEOUS STREAM AND REGENERATING AN ABSORBENT SOLUTION

CROSS-REFERENCE TO RELATED APPLICATIONS

This application is Continuation of International Application No. PCT/US13/55446, filed Aug. 16, 2013, which was published as International Publication No. WO 2014/077919, and which claims benefit of U.S. Provisional Application Nos. 61/726,355 filed Nov. 14, 2012 and 61/750,261 filed Jan. 8, 2013. All applications are incorporated herein by reference in their entirety.

BACKGROUND

Global climate change has sparked initiatives to reduce emissions of acidic gases, such as carbon dioxide ($CO_2$). Removal of acidic gases by absorption/stripping is a commercially promising technology, as it is well suited to sequester $CO_2$. $CO_2$ emissions may be produced by a variety of different processes, such as the gas stream produced by coal-fired power plants and fossil fuel powered vehicles. The removal of $CO_2$ from such gaseous streams can be an expensive process, potentially increasing the cost to produce electricity by 50% or more. Therefore, technology improvements to reduce the costs associated with the removal of $CO_2$ are highly desirable.

Gas absorption is a process in which soluble components of a gas mixture are dissolved in a liquid. Stripping is essentially the inverse of absorption, as it involves the transfer of volatile components from a liquid mixture into a gas. In a typical $CO_2$ removal process, absorption is used to remove $CO_2$ from a combustion gas, and stripping is subsequently used to regenerate the solvent and capture the $CO_2$ contained in the solvent. Once $CO_2$ is removed from combustion gases and other gases, the $CO_2$ can be captured and compressed for use in a number of applications, including sequestration, production of methanol, and tertiary oil recovery.

The conventional method of using absorption/stripping processes to remove $CO_2$ from gaseous streams is described in U.S. Pat. No. 4,384,875, which is incorporated herein by reference. This process is referred to herein as "simple stripping." In the absorption stage, the gas to be treated, containing the $CO_2$ to be removed, is placed in contact, in an absorber, with the chosen absorbent (i.e., "lean solvent") under relatively high pressure and relatively low temperature such that the absorbent solution removes virtually all the $CO_2$. The purified gas emerges at the top of the absorber and, if necessary, it is then directed towards a scrubber employing sodium hydroxide, in which the last traces of $CO_2$ are removed. At the bottom of the absorber, the absorbent solution containing $CO_2$ (also called "rich solvent") is drawn off and subjected to a stripping process to free it of the $CO_2$ and regenerate its absorbent properties. Other methods of using absorption/stripping process to remove $CO_2$ from gaseous stream are described in U.S. Patent Application Publication No. 2011/0171093 and U.S. Pat. No. 7,938,887, the entireties of which are hereby incorporated by reference.

To effect the regeneration of the absorbent solution, the rich solvent drawn off from the bottom of the absorber is introduced into the upper half of a stripper, and the rich solvent is maintained at its boiling point under pressure in the stripper. The heat necessary for maintaining the boiling point of the rich solvent in the stripper is accomplished by a reboiler. In particular, the absorbent solution contained in the stripper is reboiled by indirect heat exchange between part of the solution to be regenerated located in the lower half of the stripper and a hot fluid at appropriate temperature, generally saturated water vapor. In the course of regeneration, the $CO_2$ contained in the rich solvent is released and stripped by the vapors of the absorbent solution. Vapor containing the stripped $CO_2$ emerges at the top of the stripper and is passed through a condenser system, which returns to the stripper the liquid phase resulting from the condensation of the vapors of the absorbent solution. At the bottom of the stripper, the hot regenerated absorbent solution (also called "lean solvent") is drawn off and recycled to the absorber after having used part of the heat content of the solution to heat, by indirect heat exchange, the rich solvent to be regenerated, before its introduction into the stripper.

A major disadvantage of such prior systems is the large steam consumption of the stripper. A relatively large amount of wasted heat is generated from such systems. Another disadvantage of prior systems is the use of a reboiler, which can significantly increase the cost to perform the stripping if heat recovery means are not employed.

SUMMARY

The present disclosure generally relates to the removal and capture of acidic gases, including $CO_2$, hydrogen sulfide ($H_2S$) and mixtures thereof, from flue gas or other gases or gas streams through a stripper. The apparatus, system and method of the present disclosure, among other things, offers improved energy efficiency.

Further, the present disclosure generally relates to a configuration of a flash stripper, which recovers waste stripping steam heat more reversibly (i.e., with less energy required) using at least one or combinations of a cold bypass, a warm bypass and a hot rich solvent bypass. A rich bypass heat exchanger and/or a convective steam heater may also be employed to produce a more energy efficient process. Based on the flash stripper of the present disclosure, pilot plant cases were modeled to identify pilot plant configurations.

In addition, the present disclosure generally relates to a configuration of a reboiled stripper, which recovers waste stripping steam using a rich bypass heat exchanger and at least one or more combinations of a cold bypass, a warm bypass and a hot rich solvent bypass.

The features and advantages of the present disclosure will be readily apparent to those skilled in the art upon a reading of the description of the embodiments that follows.

DRAWINGS

Some specific example embodiments of the disclosure may be understood by referring, in part, to the following description and the accompanying drawings.

Figure 1:
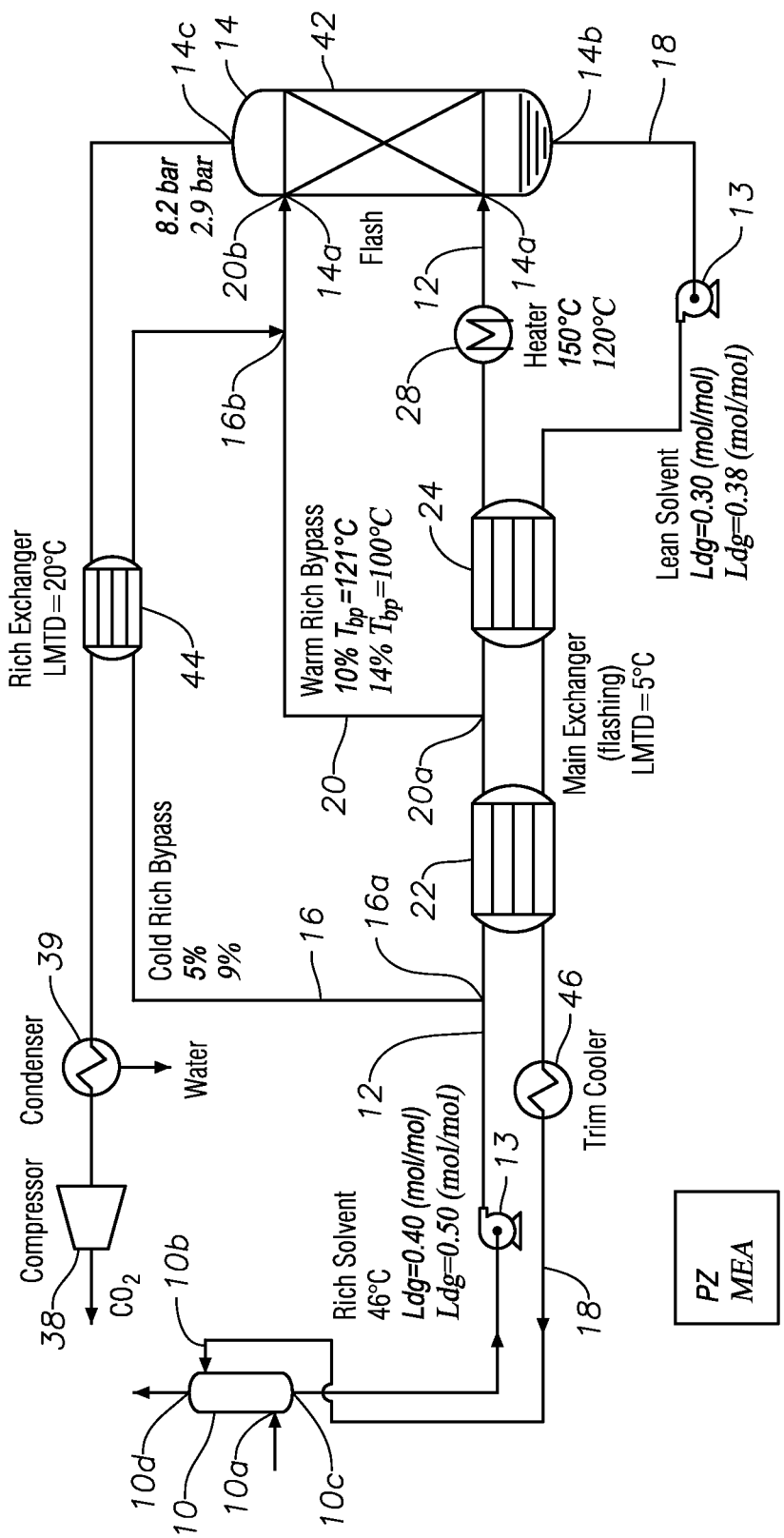
FIG. 1 is a schematic process flow diagram of acidic gas absorption and stripping utilizing a flash stripper according to a first embodiment of the present invention.

While the present disclosure is susceptible to various modifications and alternative forms, specific example embodiments have been shown in the figures and are described in more detail below. It should be understood, however, that the description of specific example embodiments is not intended to limit the invention to the particular forms disclosed, but on the contrary, this disclosure is to cover all modifications and equivalents as illustrated, in part, by the appended claims.

DESCRIPTION

Certain terminology is used in the following description for convenience only and is not limited. The words "upstream" and "downstream" designate directions in the drawings and/or in the flow of certain fluids to which reference is made. The terminology includes the above-listed words, derivatives thereof and words of similar import. Unless specifically set forth herein, the terms "a," "an" and "the" are not limited to one element, but instead should be read as "at least one."

Figure 2:
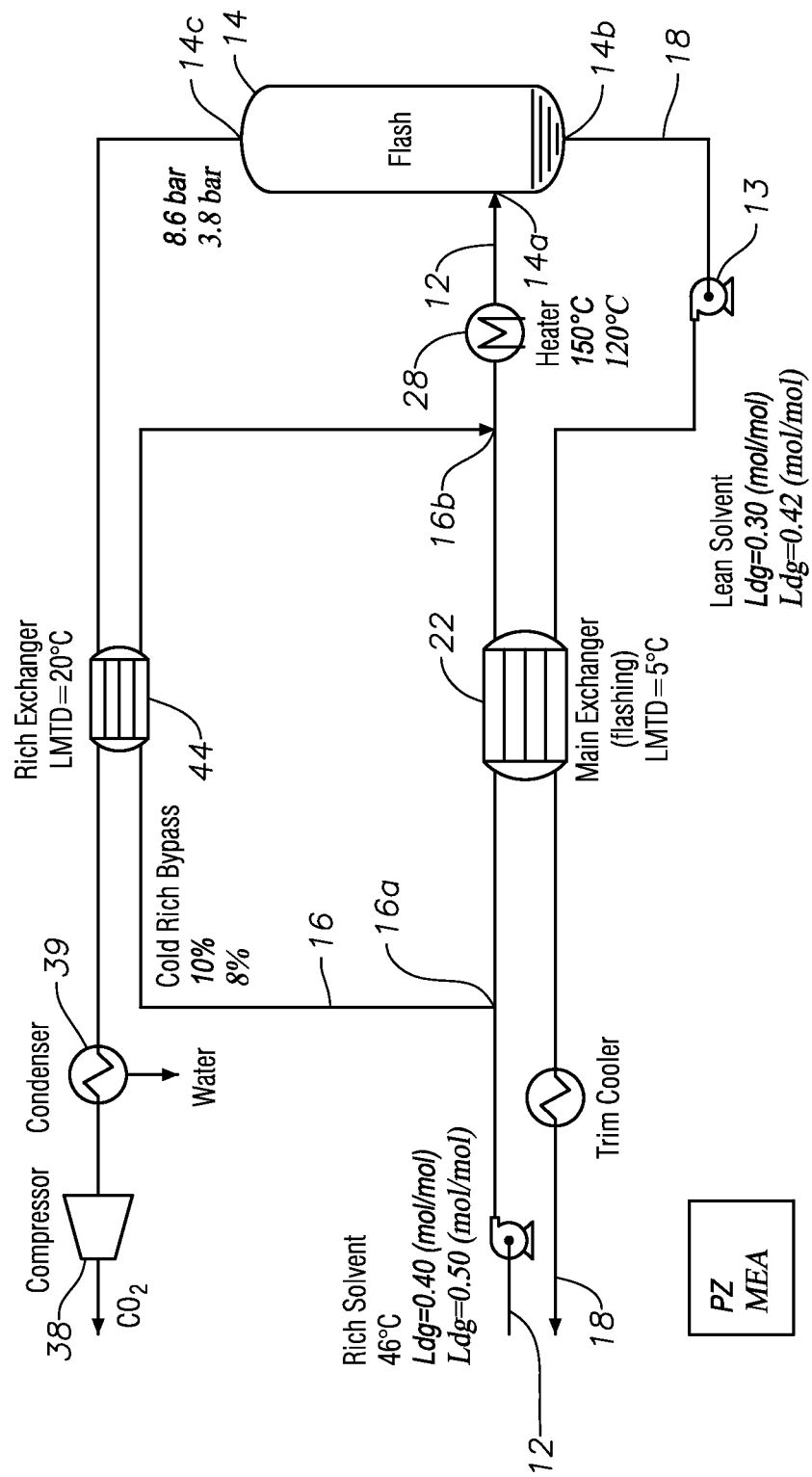
FIG. 2 is a schematic process flow diagram of acidic gas absorption and stripping utilizing a flash stripper according to a modified version of the first embodiment of the present invention.

Referring to the drawings in detail, wherein like numerals indicate like elements throughout, FIGS. 1-9 illustrate various versions of an apparatus for and method of removing/absorbing acidic gas from a gas stream and regenerating/stripping a solvent utilizing a flash stripper according to a first embodiment of the present disclosure. Alternatively, the present disclosure may be intended to take a solvent high in acidic gas and produce a solvent with a lower concentration of acidic gas. The solvent may be an absorbent solvent solution capable of absorbing acid gas and that relies upon a temperature swing for regeneration. Examples of suitable solvents include, but are not limited to, aqueous solution of monoethanolamine (MEA) of piperazine (PZ), or of other amines. More specifically, the solvent may be an aqueous blend of piperazine or other reactive amines with a tertiary amine or hindered amine that does not form a carbamate, such as piperazine/methyldiethanolamine, piperazine/2-aminopropanolamine, 2-methylpiperazine and piperazine/2-piperidine-ethanol. The solvent may include reactive primary or secondary amines, such as diglycolamine and diethanolamine. The solvent may use enzymes or other catalysts to enhance $CO_2$ absorption rate, such as methyldiethanolamine with one or more enzymes. The solvent may be a blend of piperazine with other thermally stable amines, such as piperazine/aminoethylpiperazine and piperazine/2-methylpiperazine. The solvent may be ionic liquid containing amine functionalities. FIGS. 1 and 2 provide certain sample characteristics (e.g., temperature, amount, percentage of flow, pressure, etc.) depending upon which solution is used. The modeling and design specifications shown or discussed herein were performed with a process modeling software, such as Aspen Plus®.

The present disclosure primarily discusses removal of $CO_2$. However, such disclosure is not limiting, because any acidic gas mixture capable of removal by the methods of the present disclosure is contemplated by the present disclosure. Such acidic gases may include, but are not limited to, hydrogen sulfide ($H_2S$), carbonyl sulfide (COS), carbon disulfide ($CS_2S$), and mercaptans. Further, amines may be recovered following absorption of acidic gas. In certain embodiments, the gas mixture to be treated may comprise any gas mixture produced as the byproduct of a chemical process. Suitable gas mixtures may comprise one or more of flue gas, natural gas, hydrogen gas and other gases. For example, the flash stripper configurations of the present disclosure may be used to minimize energy use in $CO_2$ capture from coal-fired power plants or fossil fuel powered vehicles. Similarly, apparatus, system and method of the present disclosure may be used in natural gas combustion in boilers, fired heaters, or gas turbines, lime and cement plants, and removal of $CO_2$ from hydrogen.

Referring specifically to FIG. 1, an absorber or absorption column 10 is operatively and fluidically connected to a flash stripper or stripping column 14. The absorber 10 includes a first inlet 10a for receiving acidic gas to be purified, a second inlet 10b for receiving a lean solvent produced by the stripper 14, a first outlet 10c for evacuating a rich solvent and a second outlet 10d for evacuating purified gas. As described in detail below, rich and lean solvent is passed or exchanged between the absorber 10 and the stripper 14.

The flash stripper 14 is a gas/liquid contactor using trays, structured packing, random packing, and/or sprays (none shown) in any combination to achieve countercurrent contacting. The flash stripper 14 of the present embodiment is distinguishable from a conventional reboiled stripper because the stripper 14 does not use a reboiler. Instead, the stripper 14 employs a heater 28 (described below), such as a convective steam heater, upstream of the stripper 14. In operation, rich solvent is heated by the heater 28 and then $CO_2$ and lean solvent is produced by flash. Since there is less solvent hold-up and residence time at elevated temperature, the heater 28 will minimize thermal degradation of the solvent. A single stage flash may be positioned within, at or near a bottom of a stripping section 42 of the stripper 14. The stripping section 42 includes the one or more sections of mass transfer means, such as the packing, trays or sprays. The stripper 14 further includes at least one inlet 14a for receiving the rich solvent produced by the absorber 10, a first outlet 14b for releasing the lean solvent and a second outlet 14c for releasing vapor containing stripped acidic gas. As described in detail below and as shown in FIG. 1, the stripper 14 may include multiple inlet ports or openings 14a to receive rich solvent, and, therefore, the stripper 14 may be referred to as a multifeed flash stripper.

A first flow path 12 connects the first outlet of the absorber 10 to the at least one inlet of the stripper 14. At least one of the inlets of the stripper 14 is directly connected to an outlet of the first flow path 12. As a result, the first flow path 12 permits at least some of the rich solvent produced by the absorber 10 to flow or otherwise move to the stripper 14. A second or return flow path 18 connects the first outlet of the stripper 14 to the second inlet of the absorber 10. As a result, the second flow path 18 permits the lean solvent produced by the stripper 14 to flow or otherwise move from the stripper 14 to the absorber 10. Movement of the rich solvent and/or the lean solvent may be facilitated by the internal pressure at which the system is maintained. Alternatively or additionally, one or more pumps 13 may facilitate movement of the rich solvent and/or the lean solvent throughout the system. For example, a pump 13 may be positioned downstream of and proximate to the first outlet 10c of the absorber 10 and/or the first outlet 14b of the stripper 14.

At least one heat exchanger 22 and possibly two or more separate heat exchangers operatively connect the first flow path 12 to the second flow path 18. In particular, a first or lower temperature heat exchanger 22 is positioned upstream of a second or higher temperature heat exchanger 24 (collectively, the "Main Exchanger"). Each heat exchanger 22, 24 may be an indirect heat exchanger that permits heat transfer between the relatively cool rich solvent in the first flow path 12 and the relatively hot lean solvent in the second flow path 18. The at least one heater 28 is positioned in the first flow path 12 upstream of the stripper 14 and downstream of each heat exchanger 22, 24.

The heat exchanger(s) 22, 24 and the heater(s) 28 may be any suitable heat transfer device. The heat exchanger may be a plate-and-frame type. One or more of the heaters 28 may be a simple shell-and-tube exchanger with condensing steam on the shell side or another type of convective steam heater. The rich solvent may be allowed or forced to flash in the second heat exchanger 25 and/or the heater(s) 28. This provides a larger temperature driving force for heat transfer and reduces the size required of the heat exchangers. The heater(s) 28 contemplated in the present disclosure are less costly than a reboiler, as used in the prior art simple stripper. A convective steam heater is more economical than a reboiler at least in part because a convective steam heater can be optimized. In the present embodiment, the stripper 14 does not use a reboiler. Rather, the vapor is created within the stripper 14 from flashing of the rich solvent stream. In the present embodiment, the rich solvent stream (e.g., the first flow path 12) is heated by one or more of the forced convection steam heaters 28 providing greater heat transfer coefficients than a kettle or thermosiphon reboiler. The multifeed process also permits greater temperature driving force in the heater(s) 28 by operating the rich solvent in plug flow countercurrent to any heat source.

At least one rich solvent bypass fluidically connects an upstream location in the first flow path 12 to at least one of a rich solvent heat exchanger 44 (described in detail below) and a predetermined point on the stripper 14. As shown in FIG. 1, the at least one rich solvent bypass may include a cold rich solvent bypass 16 and a warm rich solvent bypass 20. An inlet 16a of the cold rich solvent bypass 16 is upstream of the first heat exchanger 22, and an inlet 20a of the warm rich solvent bypass 20 is downstream of the first heat exchanger 22 and upstream of the second heat exchanger 24. As a result, any rich solvent within the warm rich bypass 20 has a higher temperature than any rich solvent within the cold rich bypass 16. For example, rich solvent within the cold rich bypass 16 may have a temperature of approximately 46° C. or within the range of 30° C.-50° C., while rich solvent within the warm rich bypass 20 may have a temperature of approximately 100° C.-121° C. At least one of the inlets 14a of the stripper 14 is directly connected to an outlet 20b of the warm rich solvent bypass 20. An outlet 16b of the cold rich bypass 16 is connected to the warm rich solvent bypass 20 at a location upstream of the outlet 20b of the warm rich solvent bypass 20.

As shown in FIG. 1, when using a PZ solution, approximately 5% of the rich solvent in the first flow path 12 enters the cold rich bypass 16 and approximately 10% of the rich solvent in the first flow path 12 enters the warm rich bypass 20. When using an MEA solution, approximately 9% of the rich solvent in the first flow path 12 enters the cold rich bypass 16 and approximately 14% of the rich solvent in the first flow path 12 enters the warm rich bypass 20. The above-stated values and those shown in the figures herein are provided simply as a non-limiting reference point, as other amounts or ranges may be acceptable or optimal. A majority of the rich solvent produced from the absorber 10 is fed to the stripper 14 through the first flow path 12. In operation, through the first flow path 12 and the bypasses 16, 20, the rich solvent is fed to appropriate points in the packing or trays in the stripping section 42 of the stripper 14 to use the vapor from the flash for additional stripping.

In embodiments employing multiple bypasses, each bypass delivers the rich solvent to the stripper 14 at a different temperature or within a different temperature range. More particularly, the rich solvent within each bypass has a progressively increasing temperature and vapor fraction (e.g., a lower feed into the stripper 14 has a higher temperature and vapor fraction than a higher feed). The temperature of the rich solvent within any of the bypasses is lower than the temperature at which the rich solvent enters the stripper 14 through the first flow path 12 at or near a bottom of the stripper 14. The heat exchangers 22, 24 and/or the heater 28 provide the additional or increased heat.

After being heated by the heater 28 to approximately 150° C. for PZ and 120° C. for MEA, the rich solvent remaining in the first flow path 12 is sent to or near the bottom of the stripper 14. $CO_2$ vapor flashes in the stripper column 42 and contacts with the warm rich bypass 20. As described above, mass transfer in the stripper 14 may be provided by any suitable means, including packing, trays, sprays or the like. If packing is used, each bypass may be separated within the stripper 14 by a section of packing. If trays are used, each bypass may be on or in a separate tray and may be separated from other bypasses by additional trays. The bottom-most bypass may be separated from the vapor feed by packing or it is feed to a tray and may be separated from the vapor feed by additional trays.

The rich solvent heat exchanger 44 operatively connects that at least one rich solvent bypass to the conduit holding the vapor containing stripped acidic gas released from or near the top of the stripper 14. More particularly, the rich solvent heat exchanger 44 operatively connects the cold rich bypass 16 to the vapor released from second outlet 14c of the stripper 14. The rich solvent heat exchanger 44 may be an indirect heat exchanger that permits heat transfer between the rich solvent in the cold rich bypass 16 and the vapor exiting the second outlet 14c of the stripper 14. In operation, the rich solvent heat exchanger 44 uses the excess or otherwise wasted heat produced by the stripper 14 to increase the temperature of the rich solvent within the cold rich bypass 16 prior to the rich solvent entering the stripper 14. Thus, the rich solvent heat exchanger 44 improves the efficiency of the system. Following passage through the rich solvent heat exchanger 44, the vapor containing stripped acidic gas may pass through a condenser 39 to remove water.

The remaining gas enters a compressor 38, and the acidic gas, such as CO₂, exits the compressor 38. The CO₂ leaving the stripper 14 and/or the combination of the condenser 39 and the compressor 38 has little or no remaining water vapor or sensible heat. In the present embodiment, condensed water is not directly recycled back to the stripper 14 so that the water makeup can be more flexible and depends on the water balance of system.

Upon completion of regeneration within the stripper 14, the first outlet 14b of the stripper 14 releases the lean solvent to be used in the absorption process. The lean solvent exiting the stripper 14 may be at approximately 150° C. The lean solvent flows through the second and first heat exchanges 24, 22 and optionally through a trim cooler 46 before entering the absorber 10 through the second inlet. If the trim cooler 46 is employed, the trim cooler 46 may be positioned downstream of the heat exchangers 22, 24 in the second flow path 18.

The above-described combination and method minimizes the total heat duty of the heater 28 by providing for reversible stripping and maximum recovery and reuse of heat in the stripper. In particular, when more heat from CO₂ vapor is effectively recovered from the rich solvent heat exchanger 14, less sensible heat is needed in the heater 28. Further, any hotter bypass stream(s) may maximize stripping of CO₂ by allowing for the reversible conversion of water vapor from the single stage flash to CO₂. The colder bypass stream(s) may recover latent heat from remaining water vapor and the sensible heat in the CO₂. The acid gas loading of the system and the flow rate and/or the temperature of each bypass may be optimized to maximize the reversibility of the stripper 14 and minimize the heat rate. Because there are a number of degrees of freedom associated with each bypass, it will be possible to design the stripper 14 with a close approach between the operating and equilibrium curve throughout the stripper 14, thereby minimizing loss of available work and maximizing reversibility.

Referring to FIG. 2, a modified version of the first embodiment is substantially similar to the first embodiment described in detail above with reference to FIG. 1. Discussion and depiction of certain similarities between the first embodiment and the present version may be omitted herein for the sake of clarity and brevity and, therefore, is not limiting. In the present version, the outlet 16b of the cold rich bypass 16 is connected to the first flow path 12 between the first heat exchanger 22 and the heater 28. The present version only includes the first second heat exchanger 22 as the "Main Exchanger." The present version includes only a single bypass that does not connect independently to the stripper 14. Thus, the stripper 14 of the present version only includes a single inlet to receive rich solvent.

Figure 3:
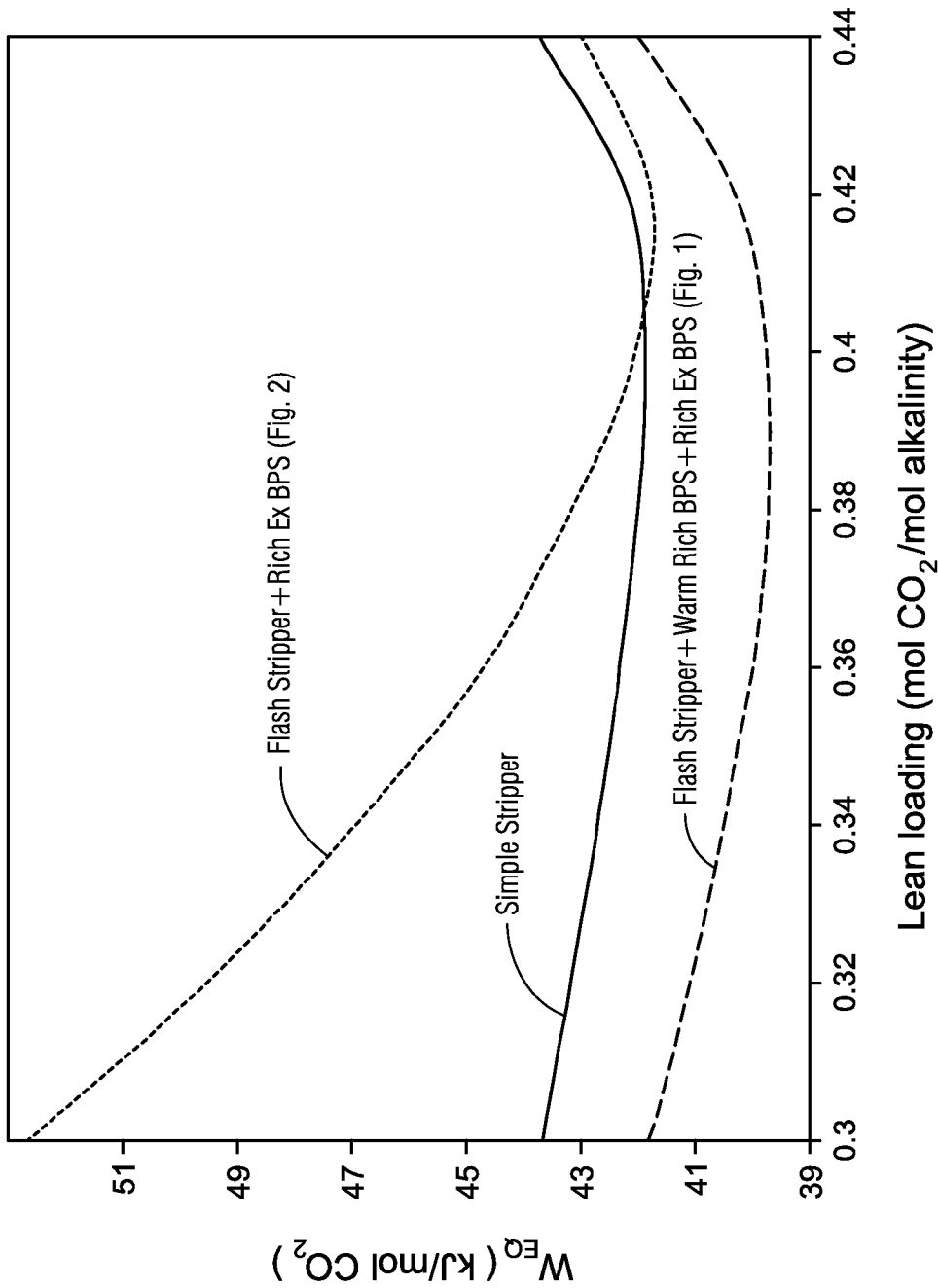
FIG. 3 is a graph comparing equivalent work to a range of lean loading for a simple stripper, the first embodiment and the modified version of the first embodiment.

Referring to FIG. 3, equivalent work is a metric or indicator of the overall energy performance. It is desirable to produce the lowest equivalent work possible. Equivalent work can be calculated using the following equations:

$$W_{eq}\left(\frac{kJ}{mol\ CO_2}\right) = W_{Heat} + W_{pump} + W_{comp} \quad (1)$$

$$W_{comp}\left(\frac{kJ}{mol\ CO_2}\right) = \begin{cases} 4.572\ \ln\left(\frac{150}{P_{in}}\right) - 4.096 & P_{in} \leq 4.56\ bar \\ 4.023\ \ln\left(\frac{150}{P_{in}}\right) - 2.181 & P_{in} > 4.56\ bar \end{cases} \quad (2)$$

$$W_{Heat}\left(\frac{kJ}{mol\ CO_2}\right) = \eta_{turbine}\left(\frac{T_{reb} + \Delta T - T_{sink}}{T_{reb} + \Delta T}\right)Q_{reb} \quad (3)$$

Optimum equivalent work can be obtained by varying the lean loading, the cold rich bypass rate, and/or the warm rich bypass rate. FIG. 3 shows the equivalent work with lean loading from 0.30-0.44 mol CO₂/mol alkalinity for 9 m MEA for a simple stripper, a configuration of the present disclosure shown in FIG. 1 ("Flash Stripper+Warm Rich BPS+Rich Ex BPA"), and a configuration of the present disclosure shown in FIG. 2 ("Flash Stipper+Rich Ex BPS"). As lean loading varies, there are trade-offs between stripping steam heat, sensible heat, compression work, and pump work. The heat of desorption does not change significantly when the lean loading is less than 0.519. Higher lean loading leads to higher CO₂ partial pressure and reduced compression work. The concentration of water vapor in the CO₂ product also decreases, but sensible heat increases because of reduced solvent capacity.

The single stage flash uses approximately 9% more work than the simple stripper because a large amount of water vapor is lost with the CO₂ product. This process can be improved with cold rich bypass or rich exchanger bypass or both. When only one of the bypasses is used with the flash stripper, compared to the simple stripper, the energy use is reduced by approximately 4.2% with PZ and approximately 0.2%-1.5% with MEA. A combination of the flash stripper 14 with both the warm rich bypass 20 and rich bypass heat exchanger uses approximately 8.9% less work with PZ and 5.0% less with MEA. Because the contribution of stripping steam heat to the total equivalent work decreases, the optimum lean loading is shifted to a lower value. Compared to the reboiled stripper with warm rich bypass and rich exchanger bypass (described in detail below in the second embodiment), the flash stripper 14 is less efficient at low lean loading but provides almost the same energy performance at optimum lean loading.

Figure 4:
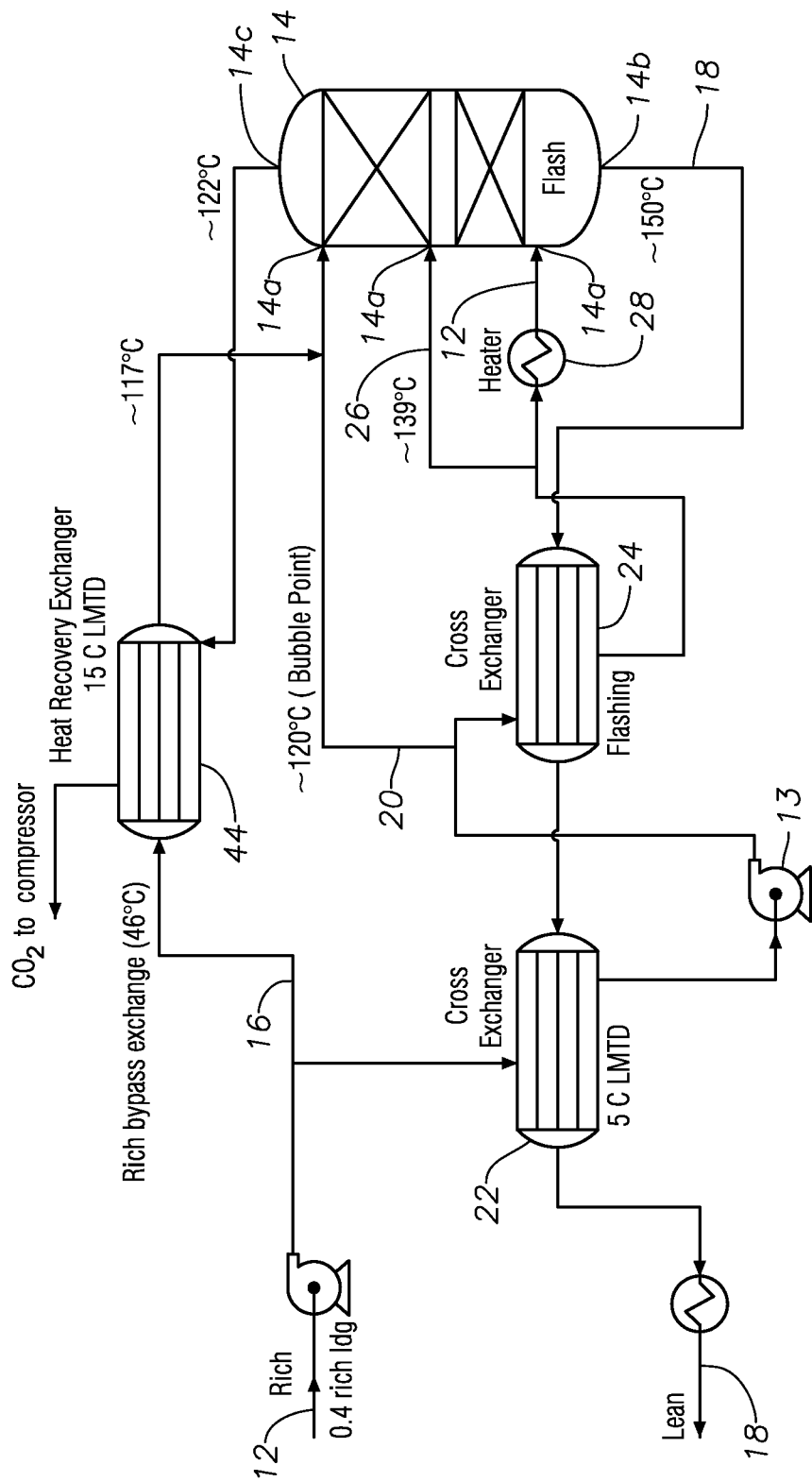
FIGS. 4-6 are schematic process flow diagrams of acidic gas absorption and stripping utilizing a flash stripper according to additional modified versions of the first embodiment of the present invention.

Referring to FIG. 4, another modified version of the first embodiment is substantially similar to the first embodiment described in detail above (FIG. 1). Discussion and depiction of certain similarities between the first embodiment and the present version may be omitted herein for the sake of clarity and brevity and, therefore, is not limiting. In the present version, a cold rich bypass 16, a warm rich bypass 20 and a hot rich bypass 26 are used in combination with a rich solvent heat exchanger 44. The stripper 14 includes three separate inlets 14a to receive rich solvent at different temperatures. The inlet of the warm rich bypass 20 is positioned between the heat exchangers 22, 24 and at the point where the rich solvent is just beginning to vaporize (the "bubble point").

Figure 5:
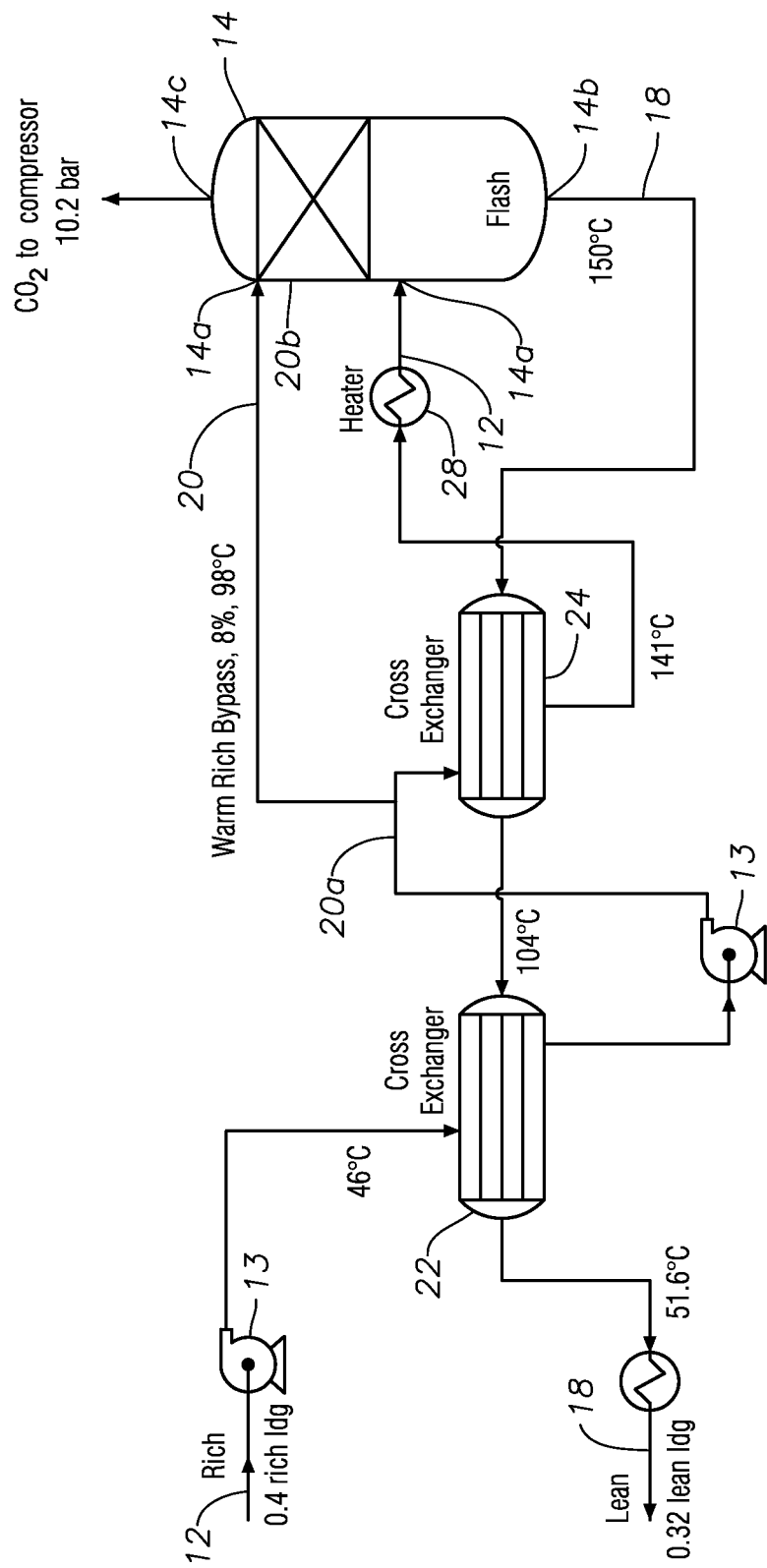

Referring to FIG. 5, yet another modified version of the first embodiment is substantially similar to the first embodiment described in detail above. Discussion and depiction of certain similarities between the first embodiment and the present version may be omitted herein for the sake of clarity and brevity and, therefore, is not limiting. In the present version, the single stage flash stripper 14 utilizes 2 m Mellapak 250X packing, 8 m PZ and approximately 4 rich loading. The present version utilizes only a warm rich bypass 20. In contrast to the first embodiment, the present version does not employ a bypass upstream of the first heat exchanger 22. An alternative of the present version may include the inlet of the warm rich solvent bypass 20 at the rich solvent liquid bubble point. Table 1 below provides the equivalent work for various levels of lean loading in the present version:

TABLE 1

Equivalent Work for various Lean Loadings (8 m PZ, 0.4 rich loading, 150° C. stripper T, 5° C. LMTD non-flashing cross exchanger, 2.5 m Mellapak 250X packing)

| Lean loading mol/mol alk | Optimum bypass flow % | Optimum bypass Temperature ° C. | Heat Duty kJ/mol | Reboiler Equivalent Work kJ/mol | Compression Work kJ/mol | Total Equivalent Work kJ/mol |
|---|---|---|---|---|---|---|
| 0.26 | 27 | 120.9 | 104.7 | 21.76 | 10.43 | 32.88 |
| 0.29 | 14 | 105.6 | 100.0 | 20.54 | 9.64 | 31.26 |
| 0.32 | 8 | 97.8 | 99.0 | 20.18 | 8.65 | 30.72 |
| 0.34 | 5 | 111.1 | 106.2 | 21.56 | 7.87 | 32.50 |

It was unexpectedly discovered that the combination depicted in FIG. 5, namely utilization of the single stage flash 14 and the warm rich bypass 20, is superior to prior approaches utilizing a two stage flash and a warm rich bypass (not shown). Those skilled in the art typically believe that a two stage flash is primarily better than a single stage flash because a significant fraction of the $CO_2$ is produced at elevated pressure, which reduces the operating and capital cost of the compressor. As a result, those skilled in the art would not have found it obvious the single stage flash, as employed in the present disclosure, operates in a superior (i.e., more efficient) manner than any two stage flash in the prior art. The inventors of the present application discovered that with significant suboptimization, a single stage flash in combination with a warm rich bypass and/or a cold rich exchange bypass improves efficiency of the regeneration process.

Figure 6:
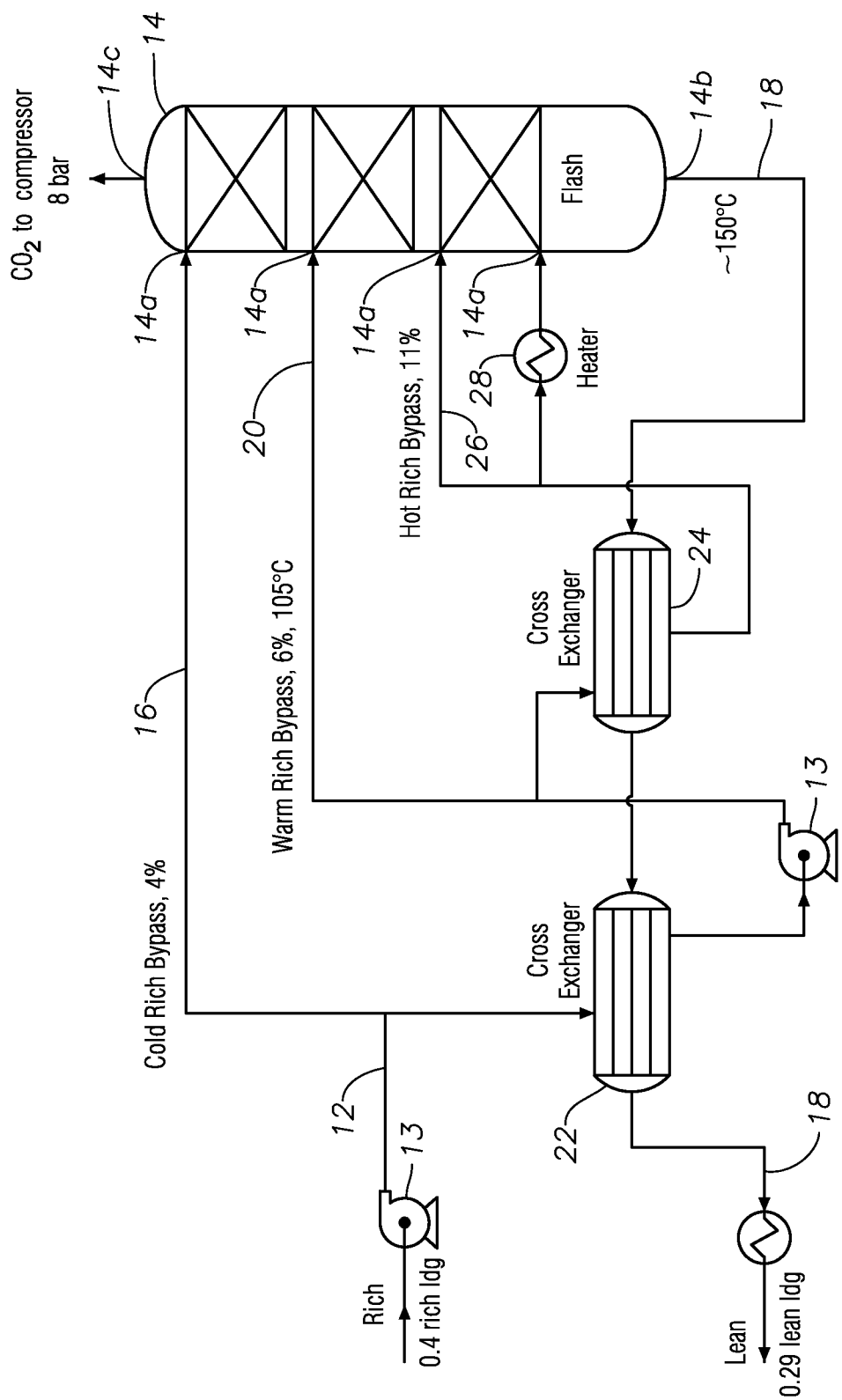

Referring to FIG. 6, still another modified version of the first embodiment is substantially similar to the first embodiment described in detail above. Discussion and depiction of certain similarities between the first embodiment and the present version may be omitted herein for the sake of clarity and brevity and, therefore, is not limiting. In the present version, a cold rich bypass 16, a warm rich bypass 20 and a hot rich bypass 26 are used. The present version is distinguishable from that shown in FIG. 4, because the present version does not employ a rich solvent heat exchanger. More particularly, rather than feeding or directing the cold rich bypass stream to one side of a heat or cross exchanger where it is heated by the overhead vapor stream from the stripper 14, in this configuration the cold rich solvent bypass stream is directed directly to or near the top of the stripper.

Figure 7:
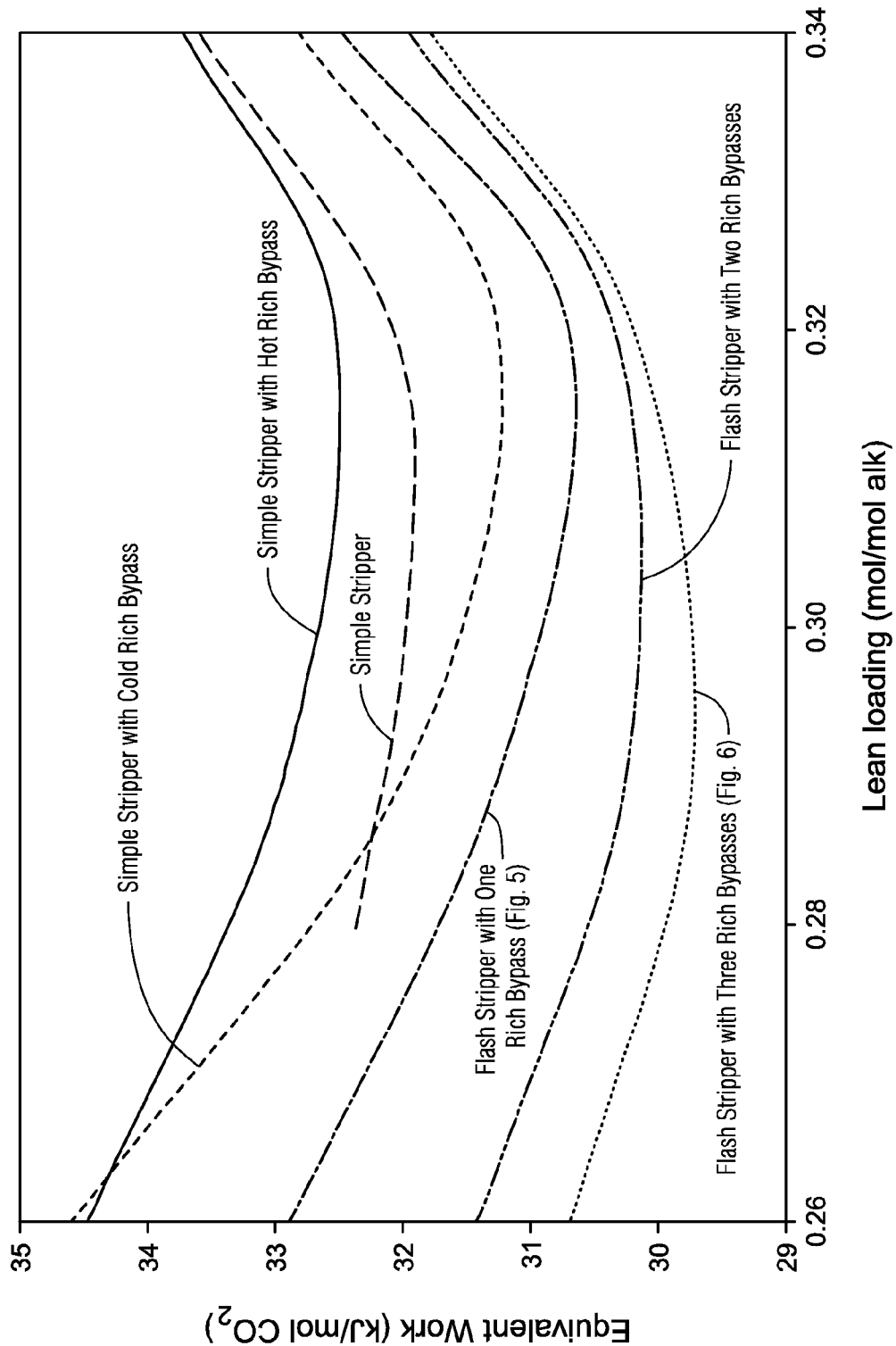
FIG. 7 is a graph comparing equivalent work to a range of lean loading for a simple stripper, two modified versions of a sample stripper, and three versions of the flash stripper of the first embodiment of the present invention.

In the present version, each bypass 16, 20, 26 has an outlet directly connected to a different portion of the stripper 14. Thus, the stripper 14 includes four separate inlets 14a for rich solvent. The warm rich bypass 20 may be omitted from the present version, if desired. Table 2 below provides the equivalent work for various levels of lean loading in the present version:

FIG. 7 graphs equivalent work values over a range of lean loading for various configurations of the first embodiment of the present disclosure. In particular, FIG. 7 compares a simple stripper, two modifications to a simple stripper, the modified version of the first embodiment shown in FIG. 5 ("Flash Stripper with One Rich Bypass"), the modified version of the first embodiment shown in FIG. 6 ("Flash Stripper with Three Rich Bypasses"), and an alternative of the embodiment shown in FIG. 6 ("Flash Stripper with Two Rich Bypasses").

Improvement of equivalent work for different stripper configurations compared to base case of simple stripper is shown in Table 3 below.

TABLE 3

Improvement of equivalent work for different stripper configurations compared to base case of simple stripper (8 m PZ, 5° C. LMTD cross exchanger, 150° C. stripping T, compression to 150 bar)

| Configuration | Equivalent Work (kJ/mol $CO_2$) | Improvement over base case |
|---|---|---|
| Simple Stripper | 32.6 | — |
| FIG. 5 | 31.4 | 2.2% |
| FIG. 6 | 29.7 | 7.5% |

Figure 8:
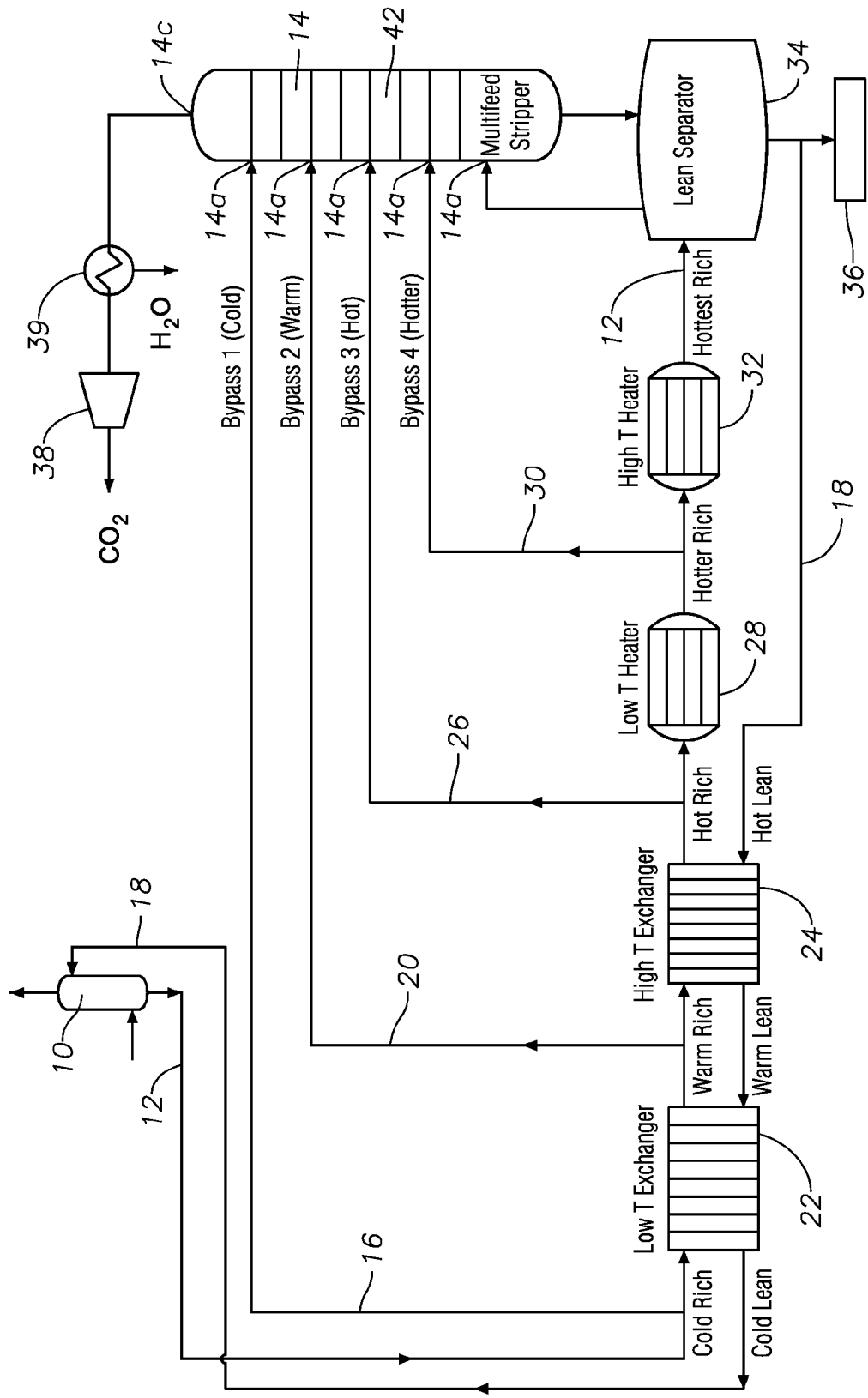
FIGS. 8 and 9 are schematic process flow diagrams of acidic gas absorption and stripping utilizing a flash stripper according to additional modified versions of the first embodiment of the present invention.

Referring to FIG. 8, another modified version of the first embodiment is substantially similar to the first embodiment described in detail above. Discussion and depiction of certain similarities between the first embodiment and the present version may be omitted herein for the sake of clarity and brevity and, therefore, is not limiting. The present version is similar to the version shown in FIG. 6. However, the present version includes additional components, such as a second, downstream or higher temperature heater 32 ("High T Heater"), a hotter rich bypass 30 with an inlet between the first, lower temperature heater 28 ("Low T

TABLE 2

Equivalent Work for variousLean Loadings (8 m PZ, 0.4 rich loading, 150° C. stripper T, 5° C. LMTD non-flashing cross exchanger)

| Lean loading mol/mol alk | Optimum bypass flow % | Optimum bypass Temperature ° C. | Heat Duty kJ/mol | Reboiler Equivalent Work kJ/mol | Compression Work kJ/mol | Total Equivalent Work kJ/mol |
|---|---|---|---|---|---|---|
| 0.26 | 27 | 120.9 | 104.7 | 21.76 | 10.43 | 32.88 |
| 0.29 | 14 | 105.6 | 100.0 | 20.54 | 9.64 | 31.26 |
| 0.32 | 8 | 97.8 | 99.0 | 20.18 | 8.65 | 30.72 |
| 0.34 | 5 | 111.1 | 106.2 | 21.56 | 7.87 | 32.50 |

Heater") and the second heater 32, and a gas/liquid separator 34 ("Lean Separator") at or near the bottom of the stripper 14. The cold rich bypass 16 reduces the water vapor at or near the top of the stripper 14, thereby improving the efficiency of the amine scrubbing process. A relatively small amount (e.g., approximately 1-10%) of the total rich solvent in the system passes through each bypass 16, 20, 26, 30. Each bypass 16, 20, 26, 30 has an outlet directly connected to a different portion of the stripper 14. Thus, the stripper 14 includes five separate inlets 14a for rich solvent.

The hottest rich solvent (i.e., the rich solvent that remains in the first flow path 12 downstream of the second heater 32) may be fed to the gas/liquid separator 34, which feeds vapor to or near the bottom of the stripper 14. The gas/liquid separator 34 may also receive hot lean liquid solvent exiting from the bottom of the stripper 14, which may be sent to an optional trim cooler 36 and/or the absorber 10 through the first and second exchangers 22, 24. The present configuration could be combined with two stage flash or two or more separate strippers. In such an embodiment, the number of bypasses may be doubled to account for the additional strippers. The stripper 14 and the gas/liquid separator 34 may operate at approximately the same pressure. They may be two separate vessels or they may be constructed as a single vessel (e.g., integrally formed) with the separator 34 serving as a sump of the stripper 14.

A simplification of the system in FIG. 8 may have zero flow in any one or any two of the bypass streams 16, 20, 26, 30. For example, the system may include one or a plurality of manual or automatic valves (not shown) that permit one or more of the bypass streams 16, 20, 26, 30 to be selectively opened and/or closed. The valves may also permit increased or decreased flow within each bypass stream 16, 20, 26, 30 depending upon the position and/or configuration of the valves. Manipulation of the valve(s) could be accomplished during operation of the system. The stripper 14 may be designed with additional bypass streams than those shown and described herein. For example, three exchangers could be used in series or three heaters could be used in series, allowing for an additional bypass stream. In all cases, less than 50% of the mass (e.g., moles) of the total rich solvent flow will be sent through all of the bypass streams. Therefore, greater than 50% of the mass of the total rich flow will be fed to the gas/liquid separator through the last heater (e.g., the second heater 32). The hottest rich stream will include or carry at least 50% of the mass of the cold rich stream. The stripper 14 may also be operated with one feed at a temperature which is greater than 10° C. less than the bubble point of the rich solvent at the pressure of the stripper 14. This single feed could be taken from the position of the warm rich bypass 20, the hot rich bypass 26, or the hottest rich bypass 30, but not the cold rich bypass 16.

Figure 9:
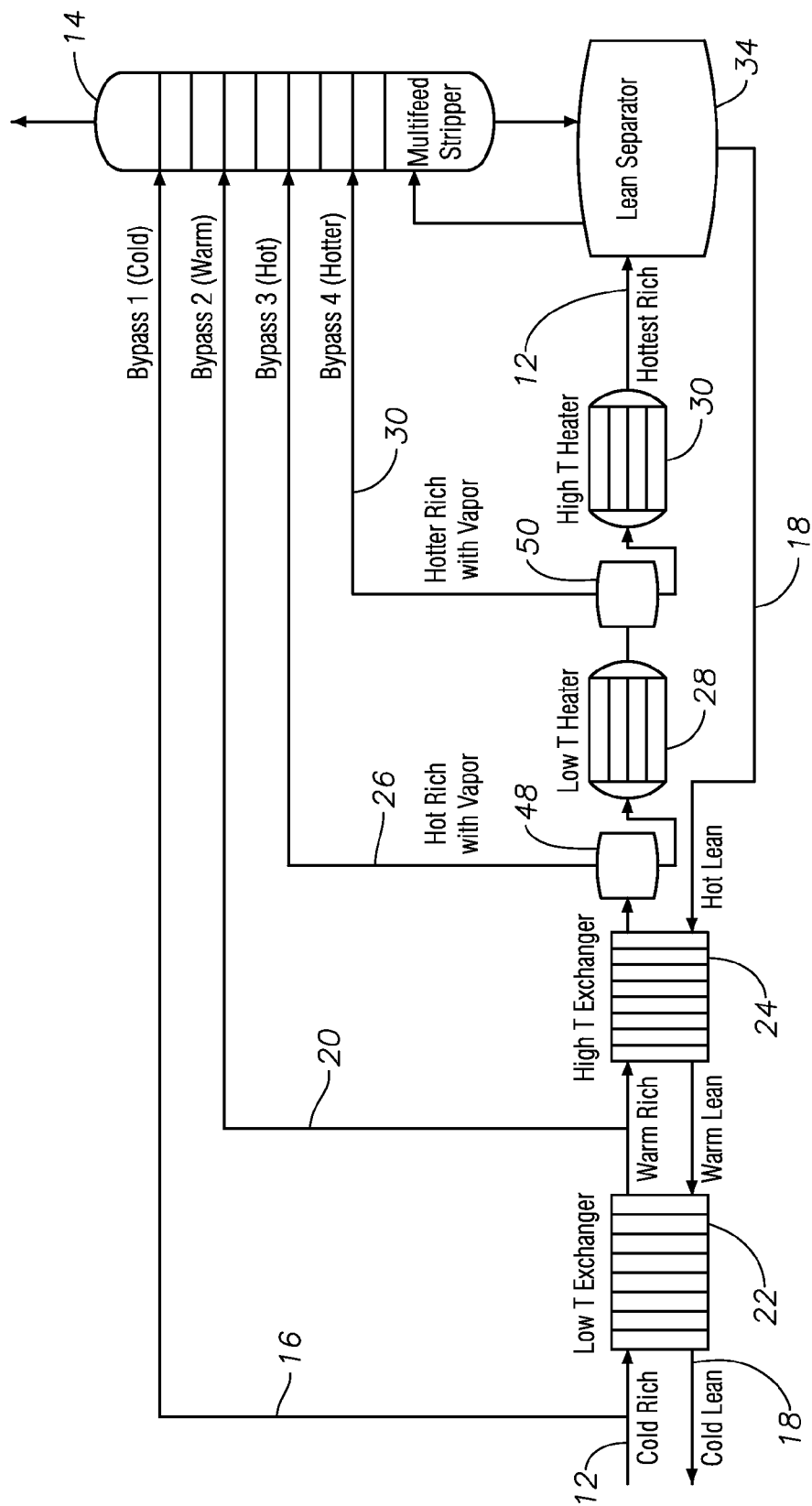

Referring to FIG. 9, another modified version of the first embodiment is substantially similar to the first embodiment described in detail above. Discussion and depiction of certain similarities between the first embodiment and the present version may be omitted herein for the sake of clarity and brevity and, therefore, is not limiting. The present version is similar to the version shown in FIG. 8. However, the present version includes two liquid bypasses 16, 20 and two bypasses 26, 30 that may contain all or some of the vapor from the first flow path 12. Two separate separators, namely a "hot" separator 48 and a "hotter" separator 50, may separate some or all of the vapor from the first flow path 12 into the hot or hotter rich solvent bypass 26, 30. Such a configuration may be beneficial, because richer vapor should reduce heat duty and less vapor in the heaters 29, 30 will allow for greater heat transfer coefficients. The bypassed stream may include an optimum amount of liquid or no liquid.

The first embodiment of the present disclosure is beneficial over the prior art, such as U.S. Patent Application Publication No. 2010/0242731 (Baburao). For example, FIG. 3 of Baburao discloses warm rich bypass with modified single stage stripper. The majority of the rich solvent in Baburao may be fed through the heat exchange to the reboiler. However, in the design of Baburao, additional solvent from the bottom of the stripper (stream 304) is mixed with the majority of the rich solvent and returned to the reboiler. Such a design may require a high temperature pump, which is not required in the first embodiment of the present disclosure. In addition, the design of Baburao does not allow for use of a convective heater. Other embodiments of Baburao, such as that shown in Baburao FIG. 4, do not feed the rich solvent directly to the bottom of the column and would likely require additional pumps. Furthermore, the use of the two heat exchangers 22, 24 in series and/or the two steam heaters 28, 30 in series to obtain an optimally-placed rich bypass is not disclosed or even contemplated in prior systems.

Figure 10:
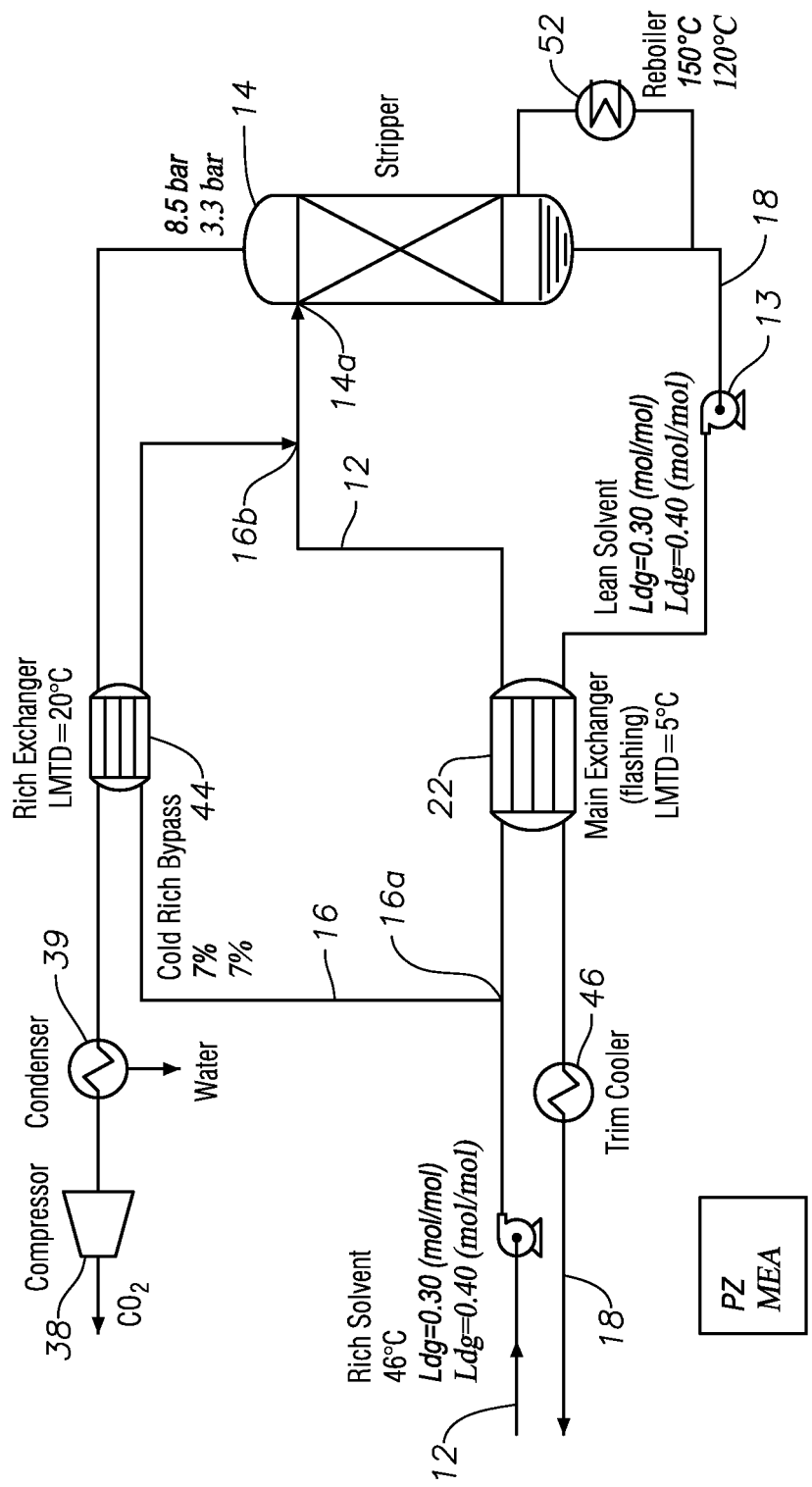
FIG. 10 is a schematic process flow diagram of acidic gas absorption and stripping utilizing a reboiled stripper according to a second embodiment of the present invention.

FIG. 10 illustrates an apparatus for and method of removing/absorbing acidic gas from a gas stream and regenerating/stripping an absorbent solution utilizing a reboiled stripper according to a second embodiment of the present disclosure. A distinguishing feature of the present embodiment as compared to the first embodiment, such as the modified version shown in FIG. 2, is that the second embodiment includes a reboiler 52 operatively and/or physically connected to the stripper 14. While the second embodiment does include a heat exchanger 22 and a rich solvent heat exchanger 44, the second embodiment does not employ an additional heater upstream of and proximate to the stripper 14.

Figure 11:
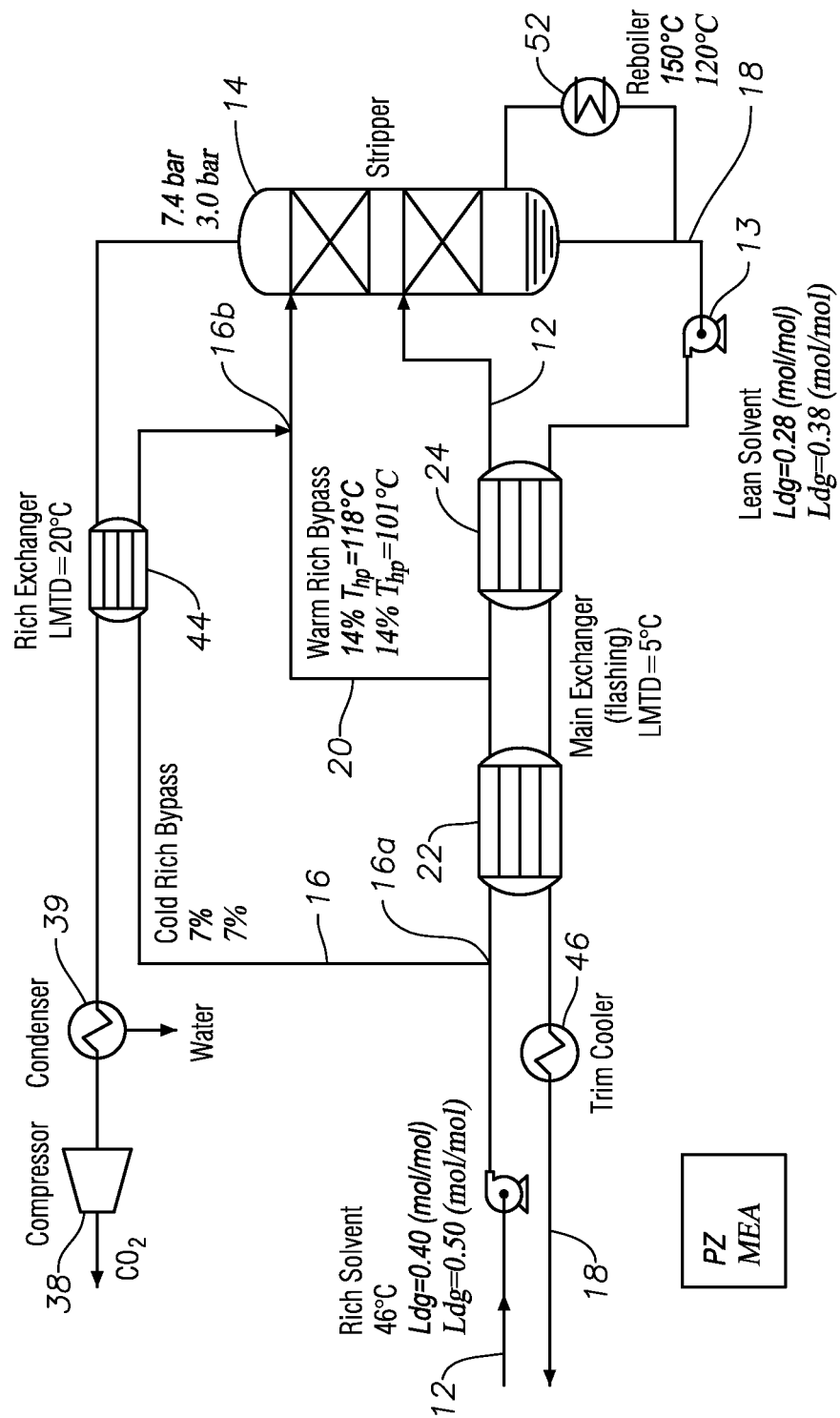
FIG. 11 is a schematic process flow diagram of acidic gas absorption and stripping utilizing a reboiled stripper according to a modified version of the second embodiment of the present invention.

Referring to FIG. 11, a modified version of the second embodiment is substantially similar to the second embodiment described in detail above. Further, the present version is substantially similar to the first embodiment. Discussion and depiction of certain similarities between the first/second embodiment and the present version may be omitted herein for the sake of clarity and brevity and, therefore, is not limiting. A distinguishing feature of the present version as compared to the first embodiment is that the present version includes a reboiler 52 and omits the heater upstream of and proximate to the stripper 14. The rich solvent flowing through the warm rich bypass 20 is chosen or removed from the first flow path 12 at its bubble point.

Table 4 below provides optimum results for a simple stripper and various configurations of the present disclosure using 8 m PZ as an absorbent solvent.

TABLE 4

Optimum results for 8 m PZ.

| Config-uration | Ldg (mol/mol) | P (bar) | Cold rich bypass (%) | Warm rich bypass (%) | Energy (kJ/mol CO$_2$) | | | |
|---|---|---|---|---|---|---|---|---|
| | | | | | $Q_{reb}$ | $W_{reb}$ | $W_{comp}$ | $W_{EQ}$ |
| Reboiled stripper | | | | | | | | |
| Simple Stripper | 0.30 | 8.5 | — | — | 105.1 | 25.4 | 9.3 | 35.9 |
| FIG. 3 | 0.30 | 8.5 | 7 | — | 93.5 | 22.6 | 9.3 | 33.1 |
| FIG. 5 | 0.28 | 7.4 | 7 | 14 | 89.5 | 21.6 | 9.9 | 32.4 |
| Flash stripper | | | | | | | | |
| FIG. 8 | 0.30 | 8.5 | 10 | — | 98.5 | 23.8 | 9.3 | 34.3 |
| FIG. 9 | 0.30 | 8.2 | 5 | 10 | 91.5 | 22.1 | 9.5 | 32.7 |

What is claimed is:

1. An apparatus comprising:
    a stripper including at least one inlet for receiving rich solvent containing acidic gas to be regenerated, a first outlet for releasing lean solvent stripped of acidic gas, and a second outlet for releasing vapor containing the stripped acidic gas;
    a first flow path delivering at least some of the rich solvent from an absorber to the inlet at or near the bottom of the stripper;
    a second flow path removing the lean solvent from the first outlet of the stripper and moving it to the absorber;
    at least a first heat exchanger and a second heat exchanger connecting the first flow path to the second flow path, the first and second heat exchangers permitting heat transfer between the rich solvent and the lean solvent;
    at least one heater positioned in the first flow path, the heater being upstream of the stripper and downstream of the heat exchangers; and
    a cold rich solvent bypass connecting the first flow path at a location upstream of the first heat exchanger to a predetermined point on the stripper, wherein the cold rich solvent bypass directs a portion of the rich solvent having a temperature within the range of 30° C. to 50° C. from the first flow path; and
    a warm rich solvent bypass connecting the first flow path at a location downstream of the first heat exchanger to the stripper, wherein the warm rich solvent bypass directs a portion of the rich solvent having a temperature of 100° C. to 121° C. from the first flow path.

2. The apparatus of claim 1, wherein the warm rich solvent bypass is connected to the stripper at a location below that of the cold rich solvent bypass.

3. The apparatus of claim 1, wherein the apparatus further comprises:
    a hot rich solvent bypass connecting the first flow path at a location downstream of the second heat exchanger and upstream of the heater in the first flow path, wherein the second heat exchanger heats the rich solvent to a temperature higher than that of the warm rich solvent, to the stripper at a location below that of the warm rich solvent bypass.

4. The apparatus of claim 3, wherein the rich solvent in each bypass enters the stripper at approximately the same pressure, and wherein a lower feed into the stripper has a higher temperature and vapor fraction than a higher feed.

5. The apparatus of claim 1, wherein the cold rich solvent bypass connects the first flow path at a location upstream of the first heat exchanger to a rich solvent heat exchanger and a top of the stripper.

6. The apparatus of claim 5, wherein the cold rich bypass connects the upstream location in the first flow path to a rich solvent heat exchanger, the rich solvent heat exchanger permitting heat transfer between the rich solvent in the cold rich bypass and the vapor released from the second outlet of the stripper.

7. The apparatus of claim 6, wherein downstream of the rich solvent heat exchanger the cold rich solvent bypass is connected to the warm rich solvent bypass at a location upstream of the connection between the warm rich solvent bypass and the stripper.

* * * * *